April 14, 1925.

J. GEIER 1,533,545

CONVERTIBLE LEVEL AND TRANSIT

Filed Feb. 28, 1924  2 Sheets-Sheet 1

Inventor
JAMES GEIER
By his Attorneys Richards, Geier

April 14, 1925.  J. GEIER  1,533,545
CONVERTIBLE LEVEL AND TRANSIT
Filed Feb. 28, 1924   2 Sheets-Sheet 2

Inventor
JAMES GEIER
By his Attorneys

Patented Apr. 14, 1925.

1,533,545

UNITED STATES PATENT OFFICE.

JAMES GEIER, OF TROY, NEW YORK.

CONVERTIBLE LEVEL AND TRANSIT.

Application filed February 28, 1924. Serial No. 695,686.

*To all whom it may concern:*

Be it known that I, JAMES GEIER, a citizen of the United States, residing at Troy, county of Rensselaer, and State of New York, have invented certain new and useful Improvements in Convertible Levels and Transits, of which the following is a specification.

This invention relates to that class of precision or measuring instruments known as convertible Y levels and transits.

While I am aware that many different forms of convertible Y levels and transits have been constructed, all of such instruments have either relied upon the use of separate sets of supporting standards for the telescope for level use and for transit use, or only a single set of standards is used and the telescope is provided with detachable trunnions for transit use, which trunnions must be removed to enable the instrument to be readily manipulated for level use. In the first class of instruments, using the separate standards, the transit standards when the instrument is to be used as a level are removed entirely from the base, or they are swung downwardly, or to one side; or they are left in position. In the first two instances the presence of the standards, obstructs the view of the spirit level, which is usually secured to the telescope, and also prevents the telescope from being rotated upon its longitudinal axis, which must frequently be done to adjust the level relatively to the telescope. If the same standards are used for both transit and level work, detachable trunnions are provided, which must be attached to the telescope when it is used as a transit, and which, as with the removable standards, must be detached when the instrument is used as a level. The provision of such movable and detachable parts offers many serious objections to such instruments, among which the following may be enumerated, first, the provision of the extra standards adds considerably to the manufacturing costs of the instruments; second, the repeated detaching and attaching of the parts causes the dowels, screws, and other parts used for positioning and securing the parts, to become worn and damaged; and third, the necessity for making the required changes and adjustments complicates the work required of the user of the instrument, requires in many cases the carrying of extra parts, with the consequent liability of losing such parts; and also involves the loss of time required for the removal or attachment of the parts in changing the instrument from a transit to a level or vice versa.

It is the principal object of this invention to overcome the objections hereinbefore enumerated by providing an instrument, which can be quickly and easily converted from a Y-level to a transit, or vice versa, without involving the necessity of adding or removing any parts.

Another object is to provide a leveling plate having a plurality of supporting legs formed integral with the plate to enable it to be used as a trivet and thereby avoid the necessity for supplying an extra part such as usually employed when the nature of the work being done requires the use of a trivet.

A further object is to provide a construction of marked simplicity, sturdiness and durability, and which, while capable of being manufactured and sold at a very low price, will provide an accurate instrument of a neat and attractive appearance.

For the accomplishment of these and such further objects as will be apparent to those skilled in the art to which this invention appertains, the invention consists in the combination, construction and arrangement of parts, an embodiment of which is illustrated in the accompanying drawings, forming a part hereof, and is more specifically described in the following specification, but it will be understood that changes, variations and modifications may be resorted to without departing from the spirit of my invention.

Figure 1:
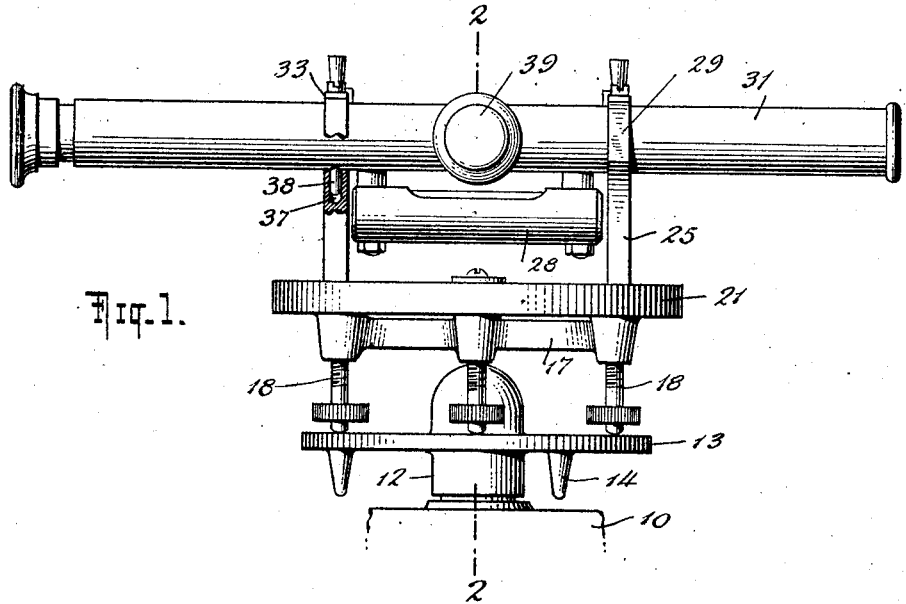
Fig. 1 is a side elevation of an instrument constructed in accordance with the principles of my invention, showing the telescope in position for use as a level.
Figure 2:
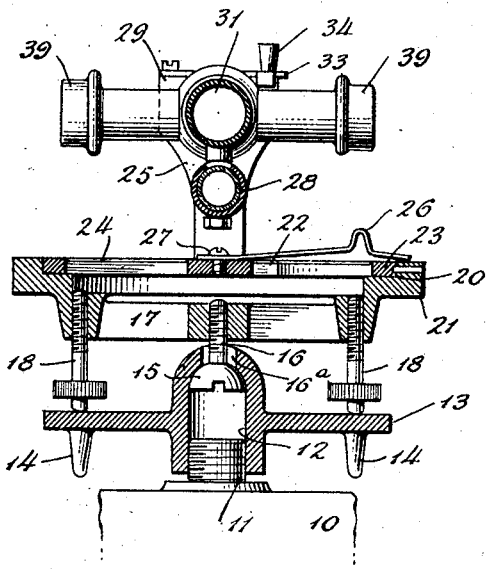
Fig. 2 is a section on the line 2—2 of Fig. 1.
Figure 3:
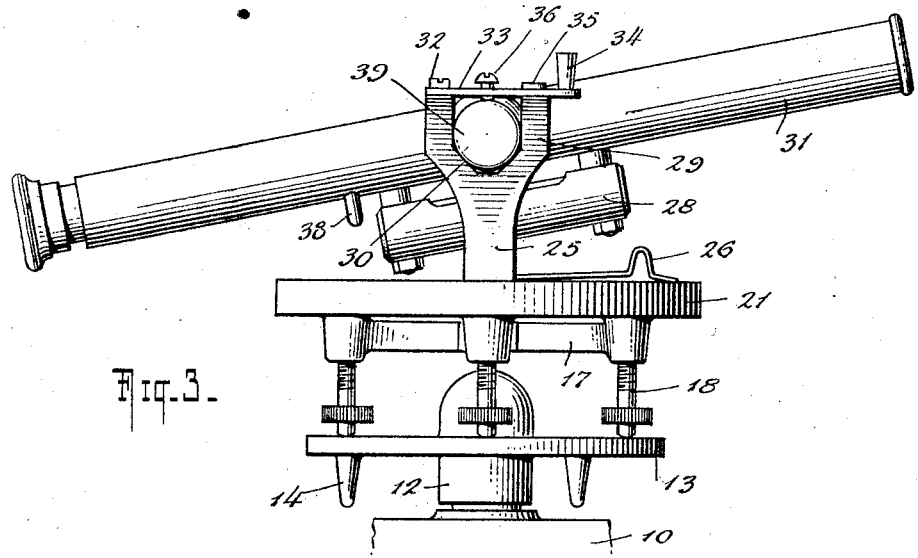
Fig. 3 is a view similar to Fig. 1, showing the telescope in position for use as a transit.

As shown in the drawings the numeral 10 indicates the top of a tripod which is provided with the usual threaded stud 11, adapted to be secured within the threaded socket 12, depending from the center of the leveling plate 13. The leveling plate 13 is provided with a plurality of (preferably three) supporting legs 14 to form a trivet upon which the plate and instrument is adapted to be supported when the instrument is used in places where a tripod can not be placed conveniently.

The upper face of the plate 13 is provided at its central part with an upwardly extending boss which forms a continuation of the socket 12, and which terminates in a rounded surface against which the round head 15 of a screw 16 contacts. The screw 16 passes through an aperture 16ª in said boss, and engages within a threaded aperture of the base 17, and serves to secure said base 17 to the plate 13. The rounded configuration of the screw head 15 permits the plate and base to be held securely in engagement while allowing the base to be adjusted to a level position by means of the leveling screws 18.

The base 17 is provided with a suitable recess or race 20 formed in the annular plate 21, which plate is either formed integral with or securely fastened to said base, and a vernier scale is provided upon said plate. A platform 22 having an annular portion 23 rotatably mounted within the race 20, is provided with a pair of side cross bars 24 from which the telescope standards 25 extend upwardly, and has an indicating pointer 26 secured to the center thereof by any suitable means such as the screw 27. A spirit level 28, which is secured to the telescope 31 is so proportioned and arranged that it will lie between the standards 25 when the instrument is used as a level as shown in Fig. 1.

Each of the standards 25 terminates at its upper extremity in a Y fork 29, the lower ends of the arms of said fork presenting the inclined faces or V-ways 30 against which the body of the telescope 31 rests when the instrument is used as a level, and the upper end of one of said fork arms has pivotally secured thereto, as at 32, one end of a retaining plate 33. The other end of the retaining plate is provided with a finger grip 34, adapted to be grasped to swing the plate into or out of engagement with a spring metal retaining clip 35 and a clamping screw 36 is mounted in the center of said plate to hold the telescope firmly in contact with the V-ways 30 when the plates 33 are swung to operative position.

One of the standards 25 as clearly shown in Fig. 1, is provided with an aperture 37, in which a dowel pin 38 projecting laterally from the telescope 31, is adapted to engage when the telescope is inserted in the standards for use as a level.

A pair of flanged trunnions 39 are rigidly secured to the telescope, preferably centrally of the ends thereof, and project laterally from the sides of said telescope a sufficient distance to engage within the forked arms of the standards 25, and the diameter of said trunnions is exactly equal to the diameter of those portions of the telescope which seat within said standards.

Figure 4:
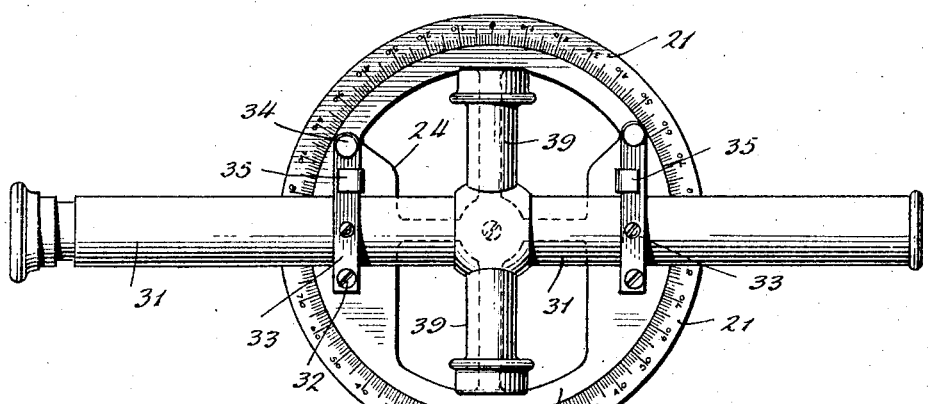
Fig. 4 is a plan view of Fig. 1.

As will be clearly seen from Figs. 1 and 4 of the drawing, the standards 25 are located entirely within the vernier scale so that when the instrument is used as a level the outer ends of the trunnions fall well within the inner circumference of the vernier and consequently said trunnions will permit a clear, unobstructed view of the vernier when horizontal angles are to be read.

The operation of the instrument will be readily understood, the telescope being placed within the standards 25 in the position shown in Figs. 1 and 4, with the dowel 38 in engagement with the aperture 37, when the device is used as a level.

In this position of the parts it will be noted that the standards 25 are placed sufficiently far apart to allow the spirit level 28 to extend between the standards, and that as the standards are located entirely within the vernier scale the trunnions 39 will not interfere with or obstruct the view of the vernier scale. As there are no additional standards between the standards 25, the space between said standards is clear and unobstructed; therefore the telescope may be rotated upon its longitudinal axis whenever it is necessary or desirable to check the adjustment of the level with respect to the standard, this rotation of the telescope being accomplished by removing the dowel pin 38, or by placing the telescope in a different position longitudinally of said standards, which may readily be done because the telescope is of the same diameter throughout substantially its entire length. When it is desired to convert the instrument to a transit, it is only necessary to swing the retaining plates 33 to inoperative position out of engagement with the telescope body, lift the telescope from the standards, place the trunnions 39 within the standards and swing the plates 32 back into engagement with the clips 35. When it is desired to use the trivet instead of a tripod support for the instrument, it is only necessary to detach the tripod and legs 14 formed upon the leveling plate 13, enabling said plate to be used directly as a trivet.

It will thus be seen that with an instrument constructed in accordance with the principles herein described, there are no extra parts required to be carried or to be detached or replaced, that the operation of converting the instrument for the various uses for which it is adapted is reduced to its maximum simplicity and that such operation may be performed in an instant.

Figure 5:
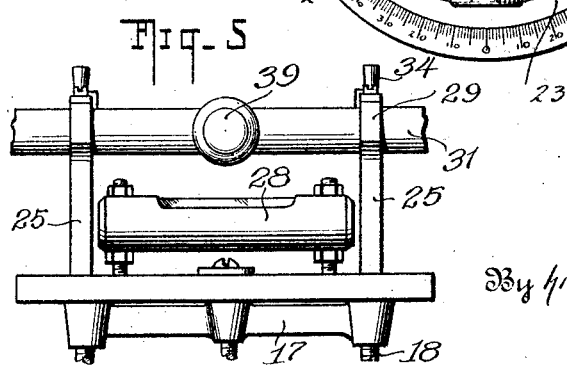
Fig. 5 is a fragmentary side elevation, showing a slightly different form of the invention.

While I have described the spirit level 28 as secured to the telescope, it will be understood that if desired the level can be secured to the platform 22 as shown in Figure 5.

Having thus described my invention, what I claim as new and desire to secure by Letters Patent, is:

1. A convertible level and transit comprising a base provided with an annular vernier scale for measuring horizontal angles, there being an annular raceway formed in said base adjacent said vernier scale, a platform having an annular portion rotatably received within said raceway, a pair of spaced standards extending upwardly from said platform adjacent said raceway and located entirely within the inner edge of said vernier scale, a telescope adapted to be seated within said standards for use as a level, a spirit level associated with said telescope, a pair of trunnions rigidly secured to and projecting laterally from said telescope, and adapted to be seated within said standards, the distance between the outer faces of said trunnions being less than the inner diameter of said vernier scale whereby said trunnions will not obstruct the view of said scale when the instrument is used as a level.

2. A convertible level and transit comprising a base provided with an annular vernier scale for measuring horizontal angles, there being an annular raceway formed in said base adjacent said vernier scale, a platform having an annular portion rotatably received within said raceway, a pair of spaced standards extending upwardly from said platform adjacent said raceway and located entirely within the inner edge of said vernier scale, a telescope adapted to be seated within said standards for use as a level, said telescope and standards provided with cooperating means to insure proper positioning of said telescope within said standards when said instrument is used as a level, a spirit level associated with said telescope, a pair of trunnions rigidly secured to and projecting laterally from said telescope, and adapted to be seated within said standards, the distance between the outer faces of said trunnions being less than the inner diameter of said vernier scale whereby said trunnions will not obstruct the view of said scale when the instrument is used as a level.

3. A convertible level and transit comprising a base provided with an annular vernier scale for measuring horizontal angles, there being an annular raceway formed in said base adjacent said vernier scale, a platform having an annular portion rotatably received within said raceway, a pair of spaced standards extending upwardly from said platform adjacent said raceway and located entirely within the inner edge of said vernier scale, a telescope adapted to be seated within said standards for use as a level, the space between said standards being free and unobstructed, a spirit level secured to said telescope and adapted to extend within the unobstructed space between said standards, a pair of trunnions rigidly secured to and projecting laterally from said telescope, and adapted to be seated within said standards, the distance between the outer faces of said trunnions being less than the inner diameter of said vernier scale whereby said trunnions will not obstruct the view of said scale when the instrument is used as a level.

4. A convertible level and transit comprising a base provided with an annular vernier scale for measuring horizontal angles, there being an annular raceway formed in said base adjacent said vernier scale, a platform having an annular portion rotatably received within said raceway, a pair of spaced standards extending upwardly from said platform adjacent said raceway and located entirely within the inner edge of said vernier scale, a telescope adapted to be seated within said standards for use as a level, the space between said standards being free and unobstructed, a spirit level secured to said telescope and adapted to extend within the unobstructed space between said standards, said telescope being of a diameter throughout substantially its entire length to enable it to be fitted within said standard in various positions relatively to its length, a pair of trunnions rigidly secured to and projecting laterally from said telescope, and adapted to be seated within said standards, the distance between the outer faces of said trunnions being less than the inner diameter of said vernier scale, whereby said trunnions will not obstruct the view of said scale when the instrument is used as a level.

5. A convertible level and transit comprising a leveling plate adapted to be detachably secured to a tripod, a plurality of supporting legs fixed to said leveling plate to enable it to be used as a trivet when it is detached from said tripod, a base mounted upon said leveling plate, means to adjust said base relatively to said leveling plate, a pair of spaced standards carried by said base and a telescope provided with means to permit it to be located accurately within said standard in either of two positions at right angles to one another whereby the instrument may be made available for different uses without the substitution or addition of extra parts.

6. A convertible level and transit including a base having an annular vernier scale thereon, a platform mounted on said base, standards carried by said platform and arranged in planes entirely within the inner edge of said scale, and a telescope capable of being seated in said standards for use as a level and having trunnions extending laterally therefrom and also capable of engagement in said standards to permit of movement of the telescope relative to the base for use as a transit.

7. A convertible level and transit including a base having an annular vernier scale thereon, a platform mounted on said base, standards carried by said platform and arranged in planes entirely within the inner edge of said scale, and a telescope capable of being seated in said standards for use as a level and having trunnions extending laterally therefrom and also capable of engagement in said standards to permit of movement of the telescope relative to the base for use as a transit, the distance between the ends of the trunnions being less than the inner diameter of said vernier scale.

8. A convertible level and transit including a base having an annular vernier scale thereon, a platform mounted on said base, standards carried by said platform and arranged in planes entirely within the inner edge of said scale, and a telescope capable of being seated in said standards in one position for use as a level and having trunnions also capable of supporting said telescope in said standards in a position different from the first-named position when the telescope is used as a transit.

9. A convertible level and transit including a base having a vernier scale thereon, standards supported above said base and arranged in planes entirely within the confines of said scale, the space between said standards being unobstructed, and a telescope capable of being seated in said standards for use as a level and having trunnions extending laterally therefrom and also capable of engagement in said standards to permit of movement of the telescope relative to the base for use as a transit.

10. A convertible level and transit including a base having a vernier scale thereon, standards supported above said base and arranged in planes entirely within the confines of said scale, the space between said standards being unobstructed, and a telescope capable of being seated in said standards in one position for use as a level and having trunnions also capable of supporting said telescope in said standards in a position different from the first-named position when the telescope is used as a transit.

11. A convertible level and transit including a base having a vernier scale thereon, standards supported above said base and arranged in planes entirely within the confines of said scale, the space between said standards being unobstructed, and a telescope capable of being seated in said standards in one position for use as a level and having trunnions also capable of supporting said telescope in said standards in a position different from the first-named position when the telescope is used as a transit, the distance between the ends of the trunnions being less than the inner diameter of said vernier scale.

In testimony whereof I have affixed my signature.

JAMES GEIER.